Dec. 23, 1969  H. W. GEGENHEIMER ET AL  3,485,257
FOUNTAIN SOLUTION SYSTEM AND APPARATUS THEREFOR
Filed July 11, 1966  6 Sheets-Sheet 5

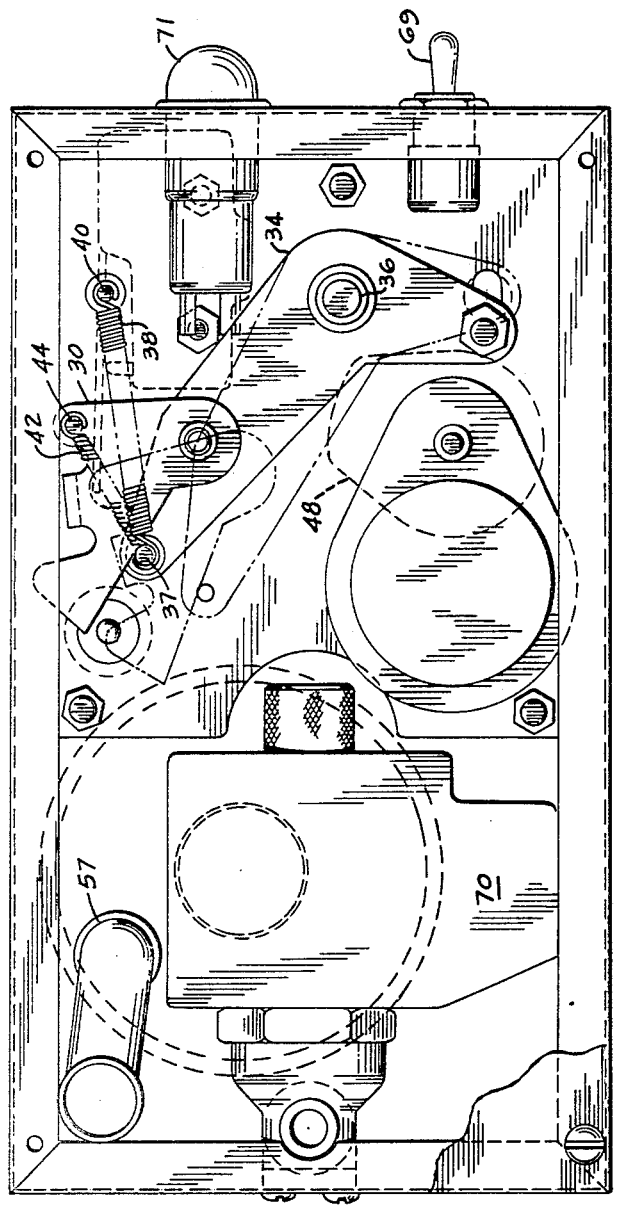

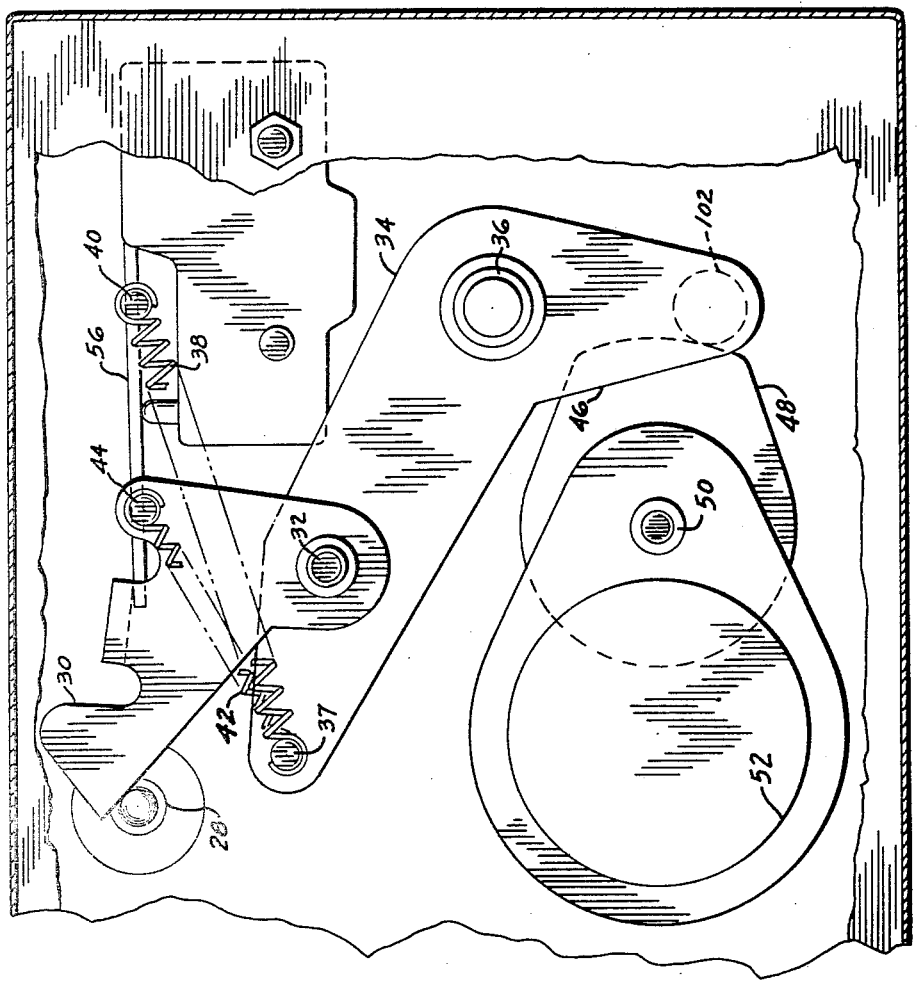

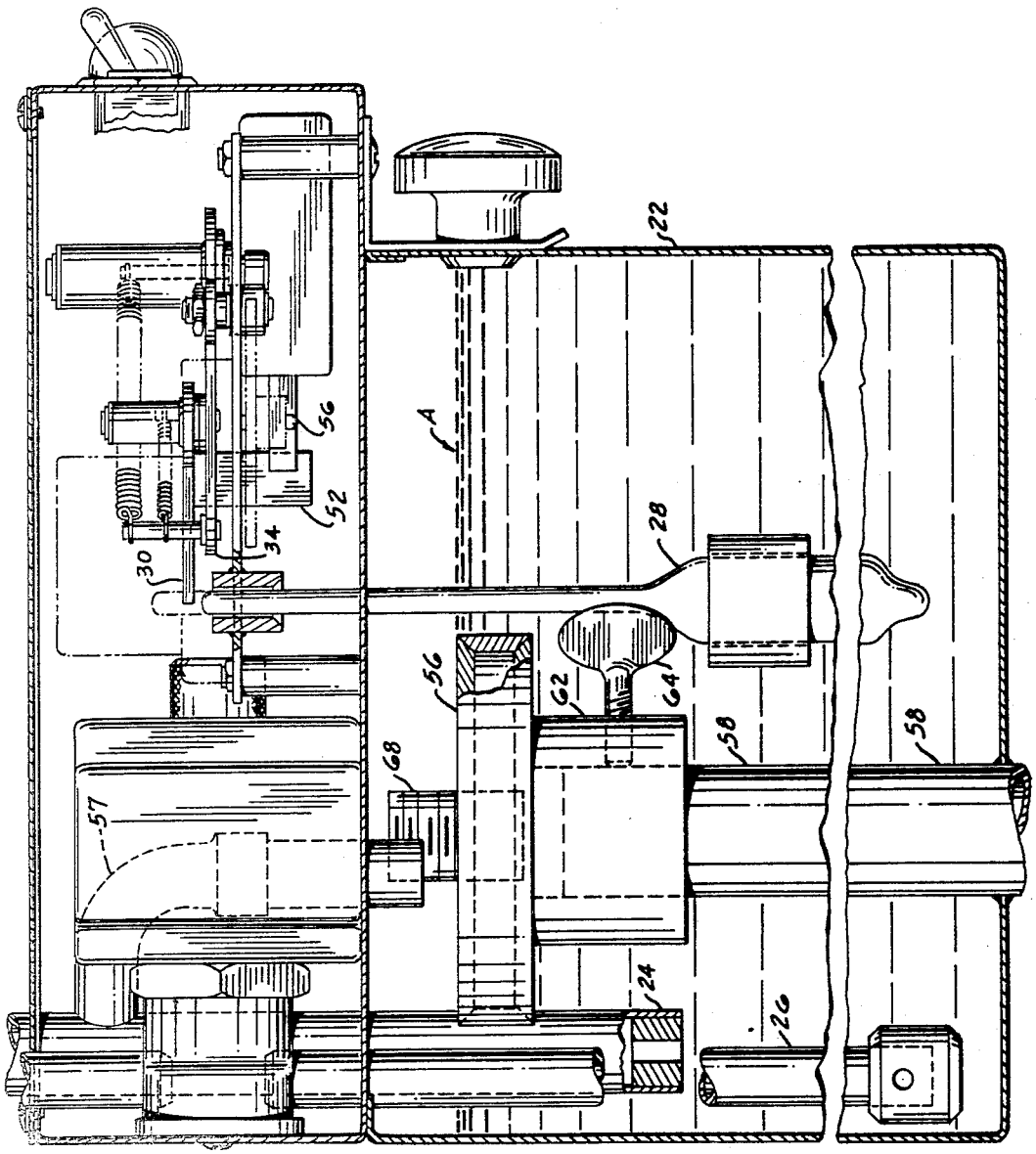

INVENTORS
HAROLD W. GEGENHEIMER
JAMES B. WYATT
BY
MORGAN, FINNEGAN, DURHAM & PINE
ATTORNEYS

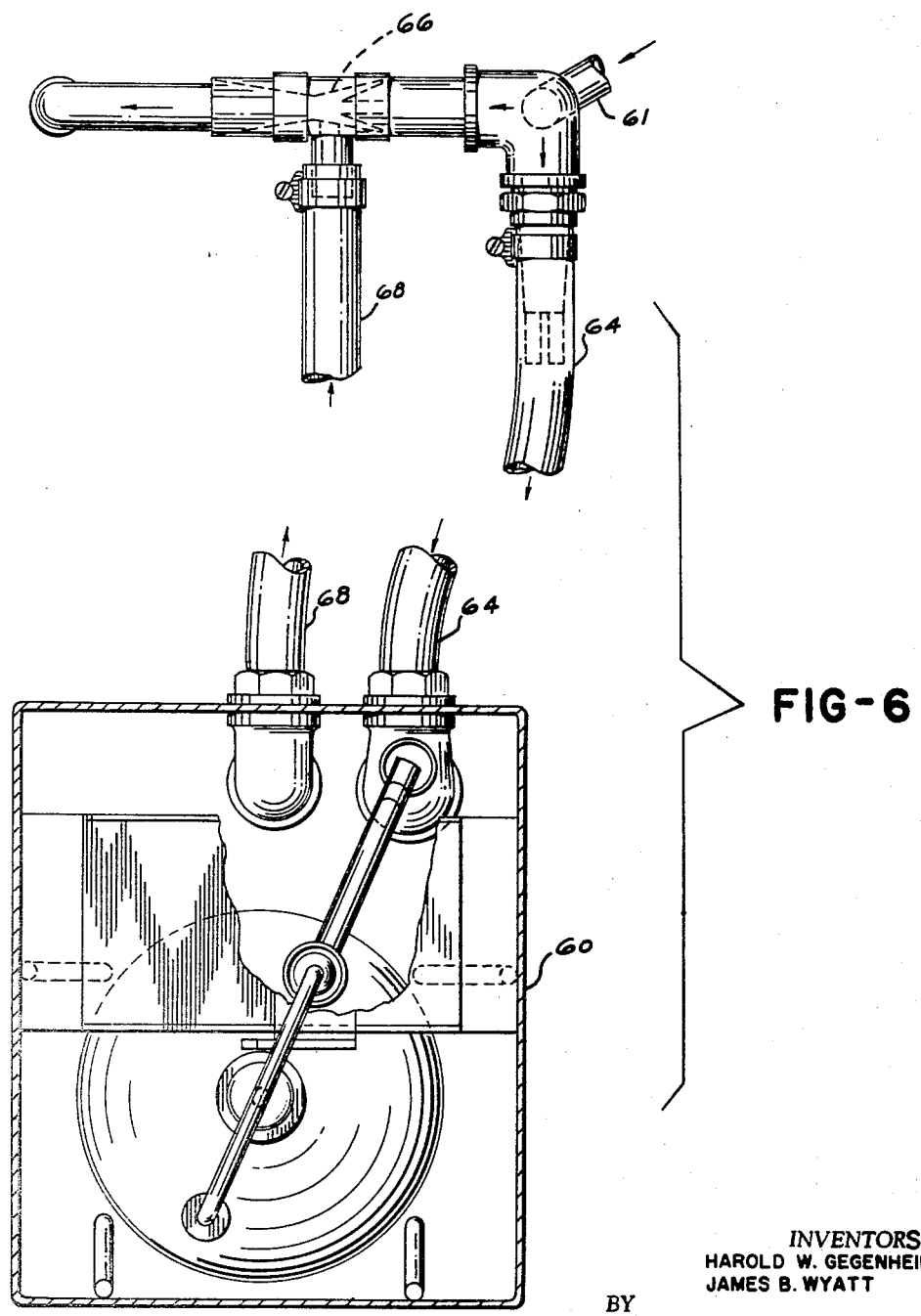

United States Patent Office 3,485,257
Patented Dec. 23, 1969

3,485,257
FOUNTAIN SOLUTION SYSTEM AND APPARATUS
THEREFOR
Harold W. Gegenheimer, Darien, and James B. Wyatt,
Stamford, Conn., assignors to Baldwin-Gegenheimer
Corporation, Stamford, Conn., a corporation of New
York
Filed July 11, 1966, Ser. No. 564,339
Int. Cl. G05d 11/06; B44b 5/00
U.S. Cl. 137—91                                3 Claims

ABSTRACT OF THE DISCLOSURE

A system and apparatus for continuously testing and maintaining a predetermined proportion of alcohol within a recirculating fountain solution system wherein a hydrometer freely floats in the fountain solution and directly and automatically opens a valve to feed alcohol into a control tank when the proportion thereof falls below a predetermined proportion.

---

This invention relates to a method and device for maintaining predetermined proportions of liquids having different specific gravities in a continuous system. More specifically, this invention relates to a method and device for maintaining predetermined proportions of the components of fountain solution in a continuously circulating system for supplying fountain solution to the fountain solution pan of a printing press.

Offset printing presses are generally provided with a water fountain pan which is filled with a solution of gum arabic and chromic or phosphoric acid dissolved in slight proportions in water. The dampening rollers apply this "etch and gum" water solution to the non-printing portions of the printing plate on the plate cylinder of the press thus insuring that no ink from the inking rollers will be received on those dampened parts of the plates. More recently it has been found that the "gum and etch" solution has better wetting qualities if mixed with a predetermined amount of alcohol.

In such systems the alcohol serves primarily as the wetting agent and in order to insure correct wetting of the roller, the gum and etch solution and the alcohol must be maintained in predetermined proportions. Alcohol, however, is highly volatile and, accordingly, evaporates at a much faster rate than the gum and etch solution components. Accordingly, the alcohol is continuously evaporating at a faster rate than the gum, the etch or water (solvent) and if permitted to continue would drastically change the proportions of the gum and etch solution and the alcohol in the fountain solution.

One proposed solution is to simply add more alchol to the fountain solution on a batch basis from time to time. This proposal is unsatisfactory for continuous operation since it is necessary to measure frequently the proportion of gum and etch solution to alcohol in the fountain solution to determine the proportions of each in order that the proper amount of alcohol be added. Obviously if the proportion of alcohol was too high it would be impossible to reduce the amount of alcohol in the solution without adding all the constituents but the alcohol in their correct proportions. On the other hand, if an insufficient amount of alcohol were added, the purpose of using alcohol would be defeated.

A feature of the present invention involves means responsive to the specific gravity of the gum and etch and alcohol solution for adding alcohol to the solution in response to an increase in the specific gravity of the solution. The methods and means of the present invention includes a continual check of the specific gravity of the fountain solution and the automatic addition of alcohol when the predetermined proportion thereof falls below a given level.

As embodied, a control means is located in the recirculating flow of fountain solution which includes elements responsive to change in the specific gravity of the solution which elements automatically supply additional alcohol to the fountain solution when the amount of alcohol falls below a predetermined level.

The invention includes a process of supplying a fountain solution to the pan of a printing press in a recirculating system wherein the fountain solution is continuously circulated between a control source of fountain solution and the fountain solution pan and alcohol is automatically added to the fountain solutions when the proportion thereof falls below a predetermined level.

More specifically, the fountain solution comprises a water solution of gum and etch and alcohol. The gum and etch portion of the fountain solution has a higher specific gravity than the alcohol portion of the solution. When the ingredients are in the proper proportion the solution has a predetermined specific gravity. In order to maintain predetermined proportions of the gum and etch and alcohol in the system the solution is passed through a container having a hydrometer therein mounted for vertical movement. When the alcohol evaporates and proportion of the alcohol falls below a predetermined level, the specific gravity of the solution in the container increases. The increase in the specific gravity of the liquid in the container results in the hydrometer moving upwardly beyond a predetermined point. Means is provided for acting ing alcohol to the solution when the hydrometer moves upwardly in response to an increase in the specific gravity of the solution. The alcohol is fed to the solution only until the specific gravity of the solution reaches said predetermined level.

In one form of the invention the hydrometer has a valve means connected thereto for controlling alcohol feed into the solution.

In another form of the invention a sensing mechanism determines the position of the hydrometer and depending upon the position of the hydrometer may, through associated elements, feed additional alcohol into the fountain solution.

The control means of the present invention can be located in the feed line to the fountain solution pan of the printing press or in the return line from the pan or in some open reservoir located along the system.

It is an object of this invention to provide a new and improved method of controlling the proportions of the components in a fountain solution for a printing press.

Another object of this invention is to provide a new and improved recirculating system for the fountain solution on a lithographic press which controls the proportion of alcohol in the fountain solution.

A further object of this invention is to provide a system for maintaining predetermined proportions of alcohol in the gum and etch fountain solution for a lithographic press wherein means are provided for controlling the proportion of alcohol in the fountain solution.

A still further object of this invention is to provide a mechanism for controlling the proportion of alcohol in a container.

Another object of this invention is to provide a new and improved method and means for controlling the proportions of liquids in a system wherein said liquids have different specific gravities.

Another object of this invention is to provide a control mechanism including means responsive to the specific gravity of liquid in a container to control the addition of one of said liquids to said container.

Another object of this invention is to provide a new and improved mechanism for controlling the proportion of alcohol in a system wherein means are provided for feeding additional alcohol to the system when the proportion of alcohol falls below a predetermined level.

Other objects and advantages of the invention will be obvious herefrom or may be learned by practice of the invention, the same being realized and attained by means of the instrumentalities and combinations particularly pointed out in the appended claims.

The invention consists in the novel parts, constructions, arrangements, combinations and improvements herein shown and described.

The accompanying drawings referred to herein and constituting a part hereof illustrate an embodiment of the invention and together with the description serve to explain the principles of the invention.

In the drawings:

FIG. 2 is a top plan view of the control mechanism in accordance with the present invention with the cover broken away.

FIG. 3 is a view similar to FIG. 2 with certain parts enlarged and certain other parts eliminated for clarity.

FIG. 4 is a longitudinal sectional view taken along line 4—4 of FIG. 2.

FIG. 6 is a partially broken top plan view of a preferred embodiment of the invention.

Figure 1:
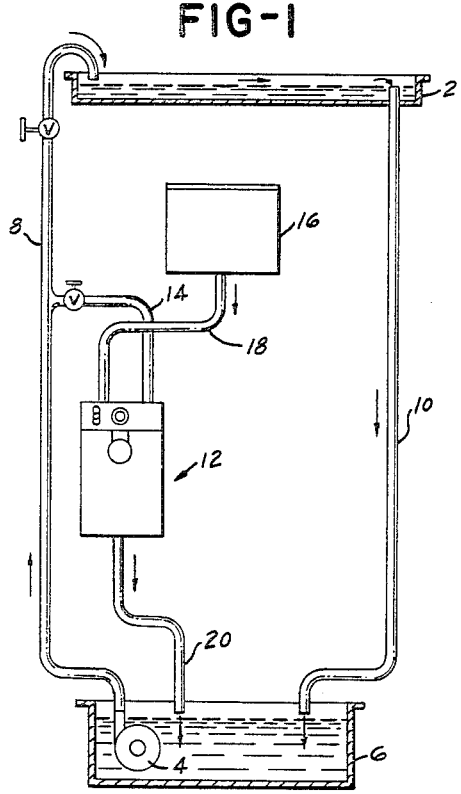
FIG. 1 is a schematic view of the new and improved recirculating system of the present invention showing the control mechanism in the feed line to the fountain pan of the printing press.

Referring to FIG. 1 there is shown therein a schematic view of a recirculating system in accordance with the present invention. As embodied herein, there is shown a fountain solution pan 2 of a conventional dampening system on a lithographic press. The fountain pan is supplied with fountain solution by means of the pump 4 in the circulating water level 6 which constitutes the central source of fountain solution through the fountain feed line 8.

Fountain solution is returned to the central source 6 from the pan and through line 10.

A characteristic of the instant invention is the provision of control means for insuring that the amount of alcohol in the fountain solution does not fall below a predetermined level.

In one embodiment of the invention the control mechanism 12 (described in detail subsequently) is located so that a portion of the fountain solution is directed through the by pass 14 to the control mechanism 12. The control mechanism is connected to a supply of alcohol 16 through line 18. The control mechanism 12 includes means for controlling the proportions of alcohol in the fountain solution and the fountain solution is returned to the water level 6 through line 20.

Figure 1A:
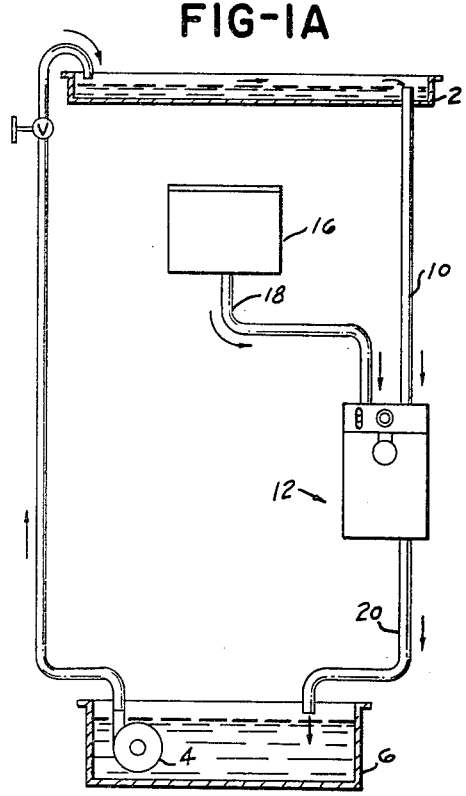
FIG. 1A is a schematic view similar to FIG. 1 showing the control mechanism in the return line.

Alternatively, as shown in FIG. 1A, the control mechanism 12 is located in the return line 10 of the recirculating system and alcohol is directed from the alcohol supply 16 through line 18 to the control mechanism 12 and thereafter directed to the central supply 6 through line 20.

Figure 1B:
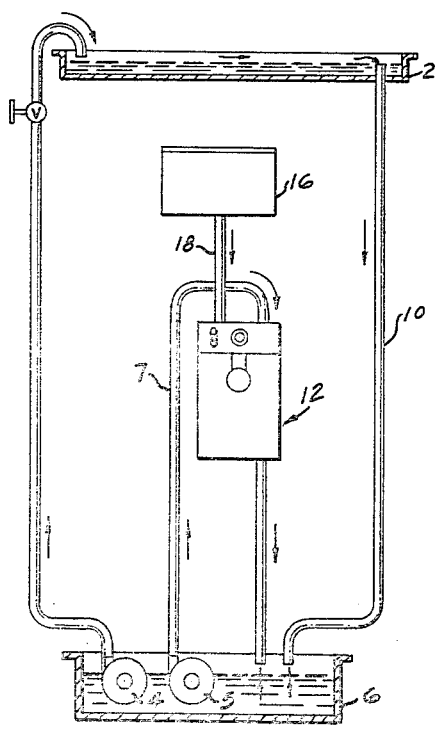
FIG. 1B is a schematic view similar to FIG. 1 showing the control mechanism with a separate pump removing solution from the open reservoir.

Alternatively, as shown in FIG. 1B, the invention is supplied with fountain solution by a separate pump 5 through line 7 and returned to circulating water level 6.

In these forms of the invention elements serving the same or similar function have been designated by the same reference numerals for convenience of description.

In accordance with this invention a new and novel control mechanism is provided for controlling the amount of alcohol in a fountain solution, to insure that the proportion of alcohol in the fountain solution does not fall below a predetermined level.

As embodied in FIGS. 2, 3 and 4, the present invention includes a container 22 which is continuously supplied with fountain solution through line 24. Line 24, it will be understood, is connected to line 14 or line 10 or line 7 depending on whether the FIG. 1, FIG. 1A or FIG. 1B position respectively for the control mechanism is employed. Alcohol is fed to the container 22 through internal line 26 which in turn is connected to line 18.

In accordance with this embodiment means is provided for automatically supplying alcohol to the container when the proportion thereof in the container falls below a predetermined level.

This means includes a conventional hydrometer 28 which reacts in response to the specific gravity of the fountain solution in the container. As the proportion of alcohol increases the specific gravity goes down and hydrometer floats lower in the container. On the other hand, as the proportion of alcohol decreases the specific gravity goes up and as a result the hydrometer floats higher in the container. The position or level of the hydrometer for a given proportion and gum and etch solution and alcohol is calibrated so that when the amount of alcohol goes below the predetermined proportions the hydrometer floats at a level below the predetermined level.

The position of the hydrometer determines whether or not additional alcohol will be feed into the container and hence added to the fountain solution. Specifically, sensing lever 30 is mounted in the container so that it can be moved to a position of potential interference with the top portion of the hydrometer rod 28 (see dotted line position in FIG. 2). As best seen in FIG. 3 the sensing lever 30 is pivotally attached at 32 to the L-shaped cam follower 34 which is pivotally connected at the fixed pivot 36. Attached to the end of the cam follower 34 is a stop rod 6. A spring 38 is attached at one end to the stop rod 37 and at the other end to the post 40 fixedly connected to the frame of the container. Attached to the stop rod 37 is another spring 42, the other end of which is attached to the movable post 44 on the movable sensing lever 30. The cam follower roller 102 is engaged by the cam 48. Cam 48 is attached to shaft 50 dirven by the cam motor 52. The cam motor 52 is preferably a 1 r.p.m. motor which causes one revolution of cam 48 each minute.

The cam follower roller 102 is urged against the cam 48 by the spring 38 and the spring 42 serves to move the sensing lever 30 into engagement with the stop rod 37.

In order to maintain an accurate control over the proportions of components in the fountain solution means are provided for maintaining the level of liquid in the container at a predetermined level. This means includes a weir 56 (see FIG. 4) having a relatively large diameter and including a discharge pipe 58 extending through the bottom of the container 22.

In the event that the level of liquid in the container rises above the predetermined level A, such excess fluid will pass into the weir and be discharged from the container 22 after which it can be placed into the circulation system.

Sudden gushes of fountain solution might cause the level thereof in the container to go above level A, and to prevent this occurrence a by-pass line 57 leading directly into the weir 26 is connected to fountain solution inlet line 24. In the event that fountain solution gushes into the container 22 a back pressure will be created causing the fountain solution to be directed into the by pass line 57 and by passing weir 56 and automatically discharging the excess fountain solution from the container through pipe 58.

In some instances it may be desired to change the level of fountain solution in the container and hence the amount of acohol in the fountain solution to maintain the predetermined proportion thereof.

The weir 56 and its extension 62 are slidably mounted on the fixed discharge pipe 58. The thumb screw 64 threads into extension 62 for engagement with pipe 58. The position of the weir can be changed by loosening the screw 64, moving the weir to the desired position and thereafter tightening screw 64. To change the predeterminde level A it is only necessary to loosen the thumb screw 64 and move the weir to its desired position. The stationary gauge 66 having a plurality of indicia 68 thereon which are calibrated to indicate the proportion of alcohol in the container when the level of the liquid therein is in predetermined level.

Means is provided in accordance with this invention wherein the sensing lever automatically feeds alcohol to the container when the proportion thereof falls below a predetermined level.

As embodied, this means includes a downwardly extending tab 52 on the sensing level and a micro-switch 56 controls a valve 70 from the alcohol supply 16. Actuation of the micro-switch 56 results in opening the valve and resulting in discharge of alcohol into the container 22 through line 26.

Figure 5:
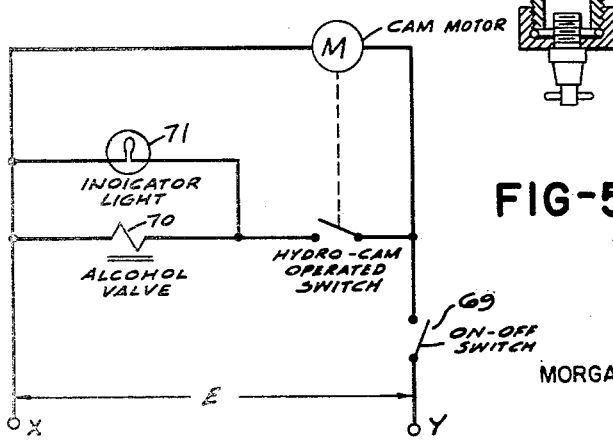
FIG. 5 is a schematic view of the electrical mechanism of one of the embodiments described herein.

An on-off switch 69 (FIG. 5) connects the mechanism to the power lines X–Y and the indicator light 71 signals the opening of the alcohol valve 70.

Operation

The operation of the device is as follows:

The device is started in operation by filling the container 2 with predetermined proportions of gum and etch and alcohol to the level A. The switch 69 is then closed to the "on" position to start operation of the cam motor.

As the cam 48 rotates about its axis the cam follower roller 102 engages its surface and pivots the cam follower 34 about axis 36. The pivot 32 and spring 42 holding lever 30 against stop rod 37 cause lever 30 to move to a position of potential engagement with the end of the hydrometer rod 28. (See broken line position FIG. 2) where the proportion of alcohol in the container is at the desired predetermined level the rod is in a low position and the sensing lever 30 will not engage the hydrometer but will be moved to the dotted line position of FIG. 2. Cam 48 will then return lever 34 and thereby lever 30 will then return the parts to the solid line position of FIG. 2. When the proportion of alcohol is below the predetermined level the specific gravity goes up and the hydrometer rises so that the sensing lever 30 will engage the hydrometer rods 28 and cause the sensing lever to pivot respect to the cam follower 34 as shown in FIG. 3 so that the extension 52 will actuate the micro-switch 56 and feed alcohol into the container. The micro-switch opens automatically and hence the alcohol will be fed into the container in spurts until the alcohol reaches the predetermined proportion resulting in lowering the hydrometer level.

As the cam 48 is rotating continuously, preferably once a minute, the sensing lever is periodically sensing the position of the hydrometer. Each time the sensing level senses the fact that the hydrometer rod has risen, alcohol will be fed to the container. Where the proportion of alcohol has fallen below the predetermined amount, alcohol will come into the container in one minute spurts until the hydrometer senses that the container has reached a predetermined alcohol content.

Figure 7:
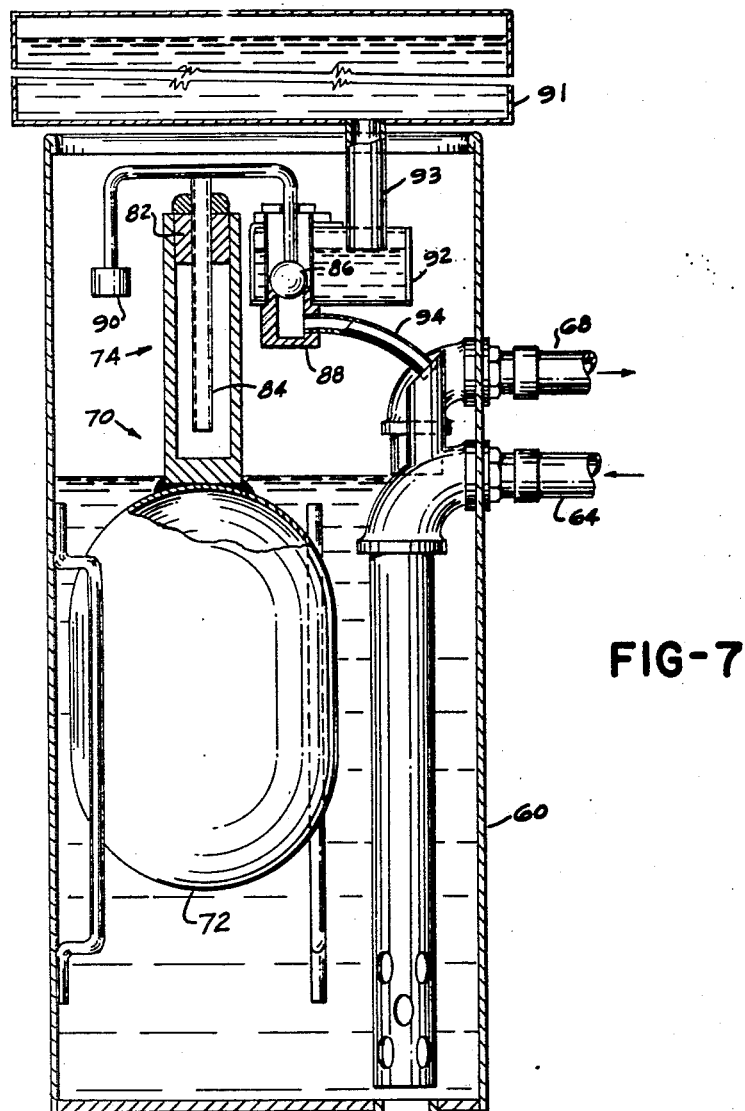
FIG. 7 is a vertical section view of the preferred embodiment of the invention illustrated in FIG. 6.

A preferred embodiment of the invention is disclosed in FIGS. 6 and 7 of the drawings. In this form of the invention a simplified structure is provided for maintaining a predetermined proportion of alcohol in the fountain solution. As in the case of the embodiment of FIGS. 2–5, the control mechanism may be located in accordance with either FIG. 1, FIG. 1A or FIG. 1B as desired. As specifically shown in FIGS. 6–7, the alcohol control device is mounted in the feed line to the fountain solution pan 2.

As embodied in FIGS. 6–7 the alcohol control tank 60 is mounted in a position such that fountain solution is pumped through line 61 by a pump in FIG. 1B and the stream is split so that a portion thereof is directed through line 64 to the control tank 60 and the other portion is directed to the aspirator 66 (shown dotted in FIG. 6). The aspirator 66 is conventional in form and operation and draws or sucks fountain solution from tank 60 through line 68 and directs it towards the fountain solution tank. The line 68 includes an elbow portion 69 terminating a predetermined distance above the bottom of tank 60. In this way the quantity of fountain solution in the tank remains constant.

In accordance with this embodiment of the invention means are mounted within the tank directly responsive to the specific gravity of the fountain solution within the tank for controlling the proportion of alcohol in the fountain solution.

In this embodiment the sensing means includes a hydrometer 70 which floats within the control tank 60 in the usual manner with its vertical position dependent upon the specific gravity of the fountain solution in the control tank.

The hydrometer including a bulb portion 72 and a vertically extending portion 74.

Extending through an internally threaded bushing 82 is a threaded shaft 84. A lock washer 86 is provided for adjusting the position of the shaft 84 with respect to the bulb.

Integral with the shaft is the ball 80 which is the ball portion of the ball valve 88. Mounted on the shaft 84 oppositely disposed from the ball 80 is a counter weight 90. The counter weight 90 in conjunction with the vertically extending guides function to maintain the hydrometer 70 and associated elements in a vertical position such that the ball 86 can seat in valve 88 when desired.

Mounted within the tank 60 is a sub-tank or alcohol tank 92. Means are provided for maintaining a supply of alcohol within tank 92 preferable at a constant level. The alcohol can be maintained within the tank 92 by a chicken feed device such as illustrated schematically in FIGURE 7. As therein shown a closed tank 91 contains alcohol and gravity feeds the same to the tank through line 93 to maintain a substantially constant level in the sub-tank 92. It will be appreciated, however, that other and different devices and means can be utilized for supply alcohol to the tank 92 and maintaining the level therein substantially constant.

Extending from the alcohol tank 92 is a spout 94 which feed into line 64.

In this manner the alcohol is directed to the bottom of the tank, through line 64, so that the agitation results from the feed of fountain solution into the tank results in mixing the alcohol throughout the tank.

It will be understood that in this form of the invention a constant replenishment of alcohol is possible. Thus as the amount of alcohol goes below the predetermined proportion, the hydrometer goes up and hence ball 86 goes up resulting in opening valve 80 and feeding alcohol through the spout 84. When the alcohol reaches its predetermined proportion the hydrometer goes downwardly thus closing the valve 88.

What is claimed is:

1. A system for continuously supplying fountain solution having a predetermined proportion of alcohol to at least one fountain pan of a printing press comprising:
   (a) a central source of fountain solution,
   (b) means for feeding fountain solution from said central source to at least one fountain solution pan of a printing press,
   (c) means for returning unused fountain solution from the fountain solution pan of the printing press to said central source, (d) a control tank positioned in communication with said central source and said fountain solution pan, (e) a hydrometer freely floating within said control tank at a height dependent upon the proportion of alcohol within said tank, (f) valve means directly responsive to the position of said hydrometer for automatically feeding alcohol into said control tank when the proportion of alcohol falls below a predetermined proportion, (g) a main supply of alcohol located outside of said control tank and a gravity closed valve connected to said hydrometer located within said control tank, said valve being opened in response to upward movement of said hydrometer.

2. A system as defined in claim 1 wherein said valve is a ball valve.

3. A system for continuously and automatically determining when the proportion of alcohol in a fountain solution falls below a predetermined level and for supplying fountain solution having a predetermined proportion of alcohol to at least one fountain pan of a printing press comprising:

(a) a central source of fountain solution, (b) means for feeding fountain solution from said central source to at least one fountain solution pan of a printing press, (c) means for returning unused fountain solution from the fountain solution pan of the printing press to said central source, (d) a control tank positioned in communication with said central source and said fountain solution pan, (e) a freely floating hydrometer within said control tank at a height dependent upon the proportion of alcohol within said tank, (f) valve means directly responsive to the position of said hydrometer for automatically feeding alcohol into said control tank when the proportion of alcohol falls below a predetermined proportion, (g) said valve means being maintained in a closed position when the proportion of alcohol is at or above said predetermined position, (h) said hydrometer floating freely upwardly when said proportion of alcohol falls below said predetermined proportion thereby immediately opening said valve means to permit the flow of alcohol into said tank until said predetermined proportion of alcohol is again restored at which time said valve means immediately closes thereby stopping the supply of alcohol.

References Cited

UNITED STATES PATENTS

| | | | |
|---|---|---|---|
| 1,664,839 | 4/1928 | Wermine | 137—91 |
| 1,040,528 | 10/1912 | Dock | 137—449 |
| 3,089,502 | 5/1963 | Davidson | 137—91 |

WILLIAM F. O'DEA, Primary Examiner

HOWARD M. COHN, Assistant Examiner

U.S. Cl. X.R.

101—147